(12) United States Patent
Zaykoski et al.

(10) Patent No.: US 6,632,762 B1
(45) Date of Patent: Oct. 14, 2003

(54) OXIDATION RESISTANT COATING FOR CARBON

(75) Inventors: James A. Zaykoski, Beltsville, MD (US); Inna G. Talmy, Gaithersburg, MD (US); Jennifer K. Ashkenazi, Washington, DC (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 58 days.

(21) Appl. No.: 09/987,493

(22) Filed: Nov. 15, 2001

Related U.S. Application Data
(60) Provisional application No. 60/301,470, filed on Jun. 29, 2001.

(51) Int. Cl.[7] .................. C04B 35/565; C04B 35/58
(52) U.S. Cl. .................. 501/92; 501/96.3; 501/102; 428/698; 428/702; 428/704; 428/426; 427/376.2; 427/380
(58) Field of Search .................. 501/92, 96.3, 102; 428/698, 702, 704, 426; 427/376.2, 380

(56) References Cited

U.S. PATENT DOCUMENTS

| | | | |
|---|---|---|---|
| 4,931,413 A | * | 6/1990 | Weir et al. .................. 501/31 |
| 5,420,084 A | | 5/1995 | Morel |
| 5,451,470 A | | 9/1995 | Ashary et al. |
| 5,759,688 A | | 6/1998 | Lee et al. |
| 6,071,615 A | * | 6/2000 | Solow et al. .................. 428/408 |
| 6,221,942 B1 | | 4/2001 | Boakye et al. |
| 6,231,969 B1 | | 5/2001 | Knight et al. |
| 6,455,107 B1 | * | 9/2002 | Sekhar et al. .................. 427/419.2 |

OTHER PUBLICATIONS

Paper presented—24th Annual Conference on Ceramics, Metal & Carbon Composites, Materials and Structures, on CD Rom, Nov. 28, 2000.

* cited by examiner

*Primary Examiner*—Karl Group
(74) *Attorney, Agent, or Firm*—Jane Barrow

(57) ABSTRACT

There is provided a ceramic coating of zirconium diboride, silicon carbide, zirconium phosphate and silicon phosphate, that protects carbon-based materials from oxidation in high temperature oxidizing environments. The coating is applied at room temperature with a brush, roller, squeegee, doctor blade, spray gun, etc., and cured at room temperature. The cured material forms a hard, protective ceramic shell. The coating can be applied to various carbon based materials including, but not limited to, amorphous carbon foam, graphitic foam, monolithic graphite, and carbon-carbon composites. Alternative compositions of the coating can be the partial or complete substitution of hafnium diboride for zirconium diboride. Additional modifications of the coating can be accomplished by partial substitution of the borides or silicides of Ti, Ta, Cr, Nb, Ti, V, Re, for zirconium diboride.

42 Claims, 4 Drawing Sheets

OXIDATION RESISTANT COATING FOR CARBON

CROSS-REFERENCE TO RELATED APPLICATION

This application claims they benefit of U.S. Provisional Application No. 60/301,470 filed Jun. 29, 2001, entitled "Oxidation Resistant Coating for Carbon", incorporated herein by reference.

BACKGROUND OF THE INVENTION

1. Field of the Invention

The present invention relates to a ceramic coating, and more particularly, to an oxidation resistant ceramic coating for carbon.

STATEMENT OF GOVERNMENT INTEREST

The invention described herein may be manufactured and used by or for the Government of the United States of America for governmental purposes without the payment of any royalties thereon or therefore.

2. Description of the Background Art

Oxidation protection coatings for carbon have been investigated and some protective coatings were developed. The oxidation protection coatings for carbon of the earlier art discloses carbides (predominantly SiC) that are typically used in the coatings because of good adherence to carbon. The following materials or combinations of materials are the primary components of the various coatings: silicon carbide, silicon nitride; silicon carbide, zirconium carbide; zirconium diboride, or hafnium diboride; and silicon carbide. All these coatings are applied by chemical vapor deposition or by melting on the surface of the carbon. Both of these application methods require high temperature heating in a protective atmosphere. Additionally, complex-shaped parts having intricate surface geometry and internal cavities are difficult to coat uniformly using these techniques.

The carbon substrate is heated at temperatures from 1000 to 1500° C. (Celsius) for chemical vapor deposition, and from 1400 to 1850° C. for melting silicon or zirconium on the surface of the carbon. Due to the high temperatures at which coatings are applied and differences in coefficients of thermal expansion (CTE) between the coating materials and the carbon, microcracks develop in the coatings during cooling to room temperature. The coatings have higher CTE than carbon. During use in an oxidizing atmosphere, the microcracks allow direct contact between oxygen and carbon, eliminating the oxidation protective capabilities of the coating. Additionally, the microcracks can lead to spalling of the coating. Traditional solutions to the microcracking problem are (1) to apply multiple layer coatings where the different materials in each layer minimize thermal expansion mismatch with the carbon, or (2) to introduce additives, such as $Li_2O$ or $B_2O_3$, which help to create low melting temperature glass which seals the microcracks. These approaches have yielded coatings which protect carbon from oxidation at temperatures below 1400° C. for long term applications. At temperatures above 1500° C., coatings provide oxidation protection for a few hours to a few minutes.

Exemplars of the art are U.S. Pat. No. 5,420,084 to Morel, issued on May 30, 1995, for Coatings for Protecting Materials Against Reactions with Atmosphere at High Temperatures, U.S. Pat. No. 5,759,688 to Lee et al., issued on Jun. 2, 1998, for Silicon Carbide Fiber Reinforced Carbon Composites, U.S. Pat. No. 6,221,942 B1 to Boakye et al., issued on Apr. 24, 2001, for Zircon-carbon for Ceramic Composite Fiber Coatings and Fine-grained Zircon Powder, U.S. Pat. No. 6,231,969 B1 to Knight et al., issued on May 15, 2001, for Corrosion, Oxidation And/or Wear-resistant Coatings, and U.S. Pat. No. 5,451,470 to Ashary et al., issued on Sep. 19, 1995, for Nickel-chromium Corrosion Coating and Process for Producing it.

SUMMARY OF THE INVENTION

It is therefore an object to provide a coating for carbon that is more resistant to oxidation.

It is another object to provide an oxidation resistant coating for carbon that can be cured at room temperature.

It is yet another object to provide an oxidation resistant coating for carbon that can be applied using conventional painting techniques on large or small intricately shaped structures.

It is yet another object to provide an oxidation resistant coating for carbon that reduces costs by lowering energy consumption and having no need for complex processing equipment.

To achieve the above and other objects of the present invention, there is provided a ceramic coating of zirconium diboride, silicon carbide, zirconium phosphate and silicon phosphate, which protects carbon-based materials from oxidation in high temperature oxidizing environments. The coating is applied at room temperature with brush, roller, squeegee, doctor blade, spray gun, etc., and cured at room temperature. The cured material forms a hard, protective ceramic shell. The coating can be applied to various carbon based materials including, but not limited to, amorphous carbon foam, graphitic foam, monolithic graphite, and carbon carbon composites.

Alternative compositions of the coating can be the partial or complete substitution of, hafnium diboride for zirconium diboride. Additional modifications of the coating can be accomplished by partial substitution of the borides or silicides of Ti, Ta, Cr, Nb; Ti, V, Re: for zirconium diboride. The present invention provides a composition for improved oxidation protection of carbon-based materials. The coating materials can be cured at room temperature and can be applied using conventional painting techniques on large or small intricately shaped structures. These features lead to significant decrease in cost because of lower energy consumption and no need for complex processing equipment.

BRIEF DESCRIPTION OF THE DRAWINGS

A more complete appreciation of this invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE PREFERRED EMBODIMENTS

Figure 1:
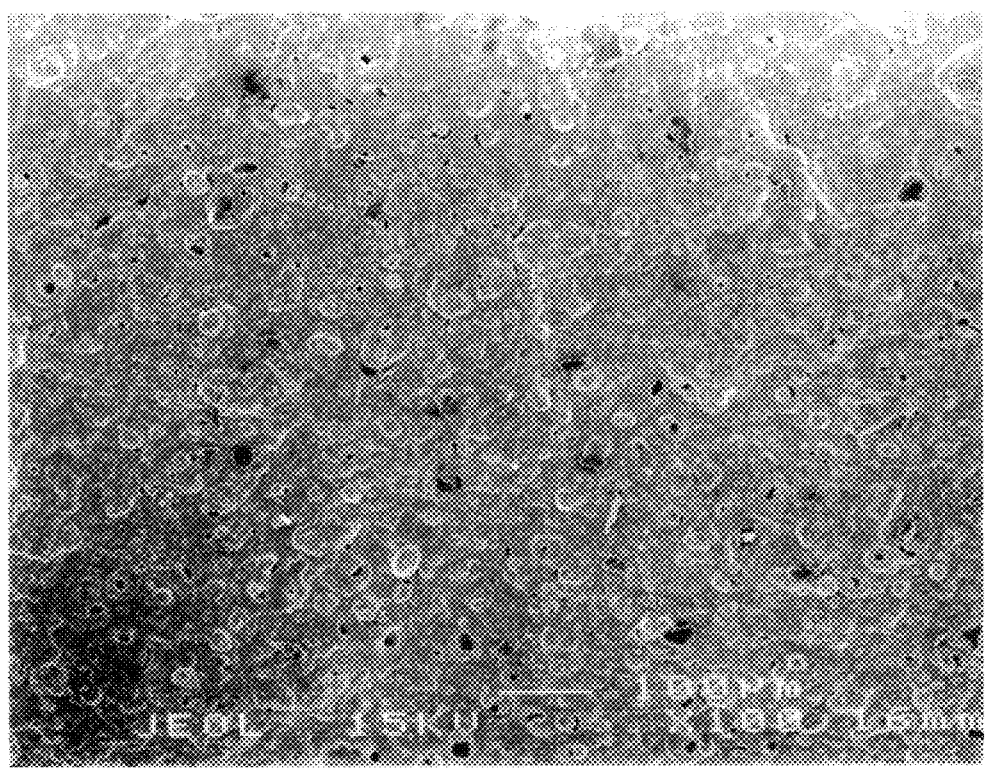
FIG. 1 shows a SEM of a surface of $ZrB_2+SiC+H_3PO_4$ coating cured at R.T. (room temperature) having dense, crack-free coating.
Figure 1:
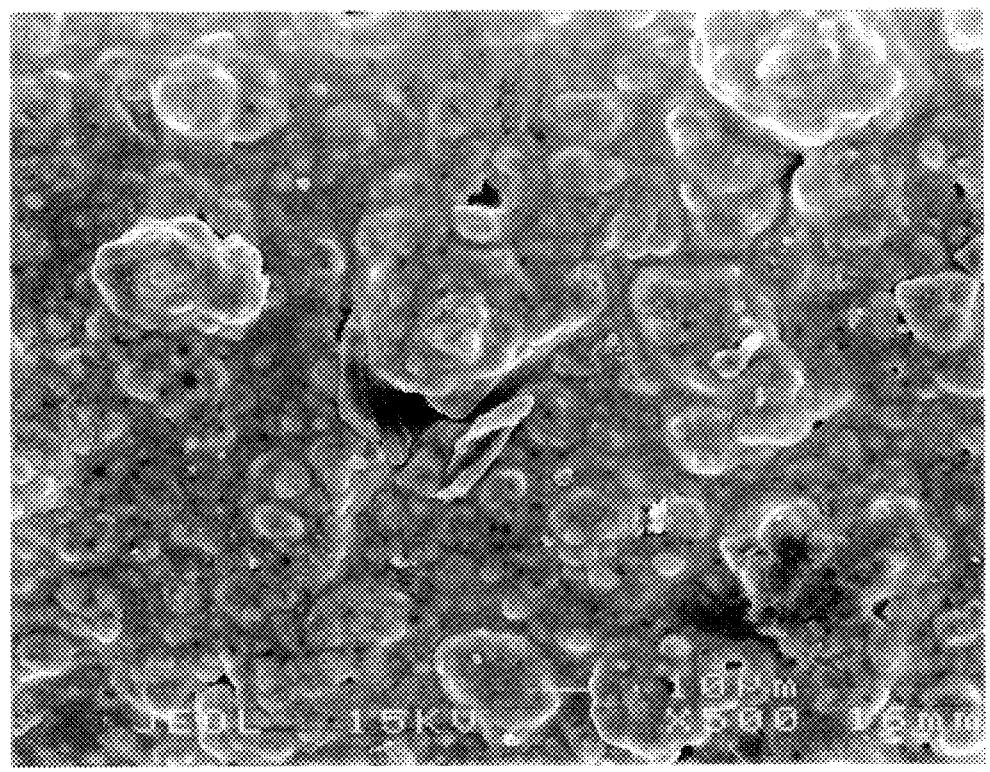

The present invention is a ceramic coating of zirconium diboride, silicon carbide, zirconium phosphate and silicon phosphate, which protects carbon-based materials from oxidation in high temperature oxidizing environments. The coating is applied at room temperature with brush, roller, squeegee, doctor blade, spray gun, etc., and cured at room temperature. The cured material forms a hard, protective ceramic shell. The coating can be applied to various carbon based materials including, but not limited to, amorphous carbon foam, graphitic foam, monolithic graphite, and carbon-carbon composites.

The starting materials for the coating of the present invention includes $ZrB_2$ and SiC powders and phosphoric acid. The $ZrB_2$:SiC molar ratio was varied from 5:1 to 1:1. The preferred ratio of $ZrB_2$: SiC is 2:1. The volume percentage of acid solution was from 5 to 50% in order to vary the consistency of the paste. The preferred amount of acid is 20 vol. % (volume percent). The concentration of the acid can be varied from 85% to 40%. The preferred concentration is 85% $H_3PO_4$. Concentrations higher than 85% $H_3PO_4$ may possibly be used. The $ZrB_2$ powder had particle size below 44 microns (-325 mesh). Three different SiC powders were used: 1 $\mu$m average particle size, 5–10 $\mu$m, and 10–20 $\mu$m. The preferred particle size for the SiC 1 $\mu$m. The raw materials are mixed using a mortar and pestle, but other conventional mixing techniques can be used. The coating was applied to dry, carbon articles at room temperature using a brush or squeegee. The preferred thickness of the coating is less than or equal to 100 $\mu$m. Coated carbon samples can be cured at temperatures ranging from 25° C. to 100° C. The preferred curing cycle is room temperature (about 25° C.) for at least 18 hours. Subsequent coats may be applied after curing. The number of coats was varied from 1 to 5, with 4 coats being preferred to yield a coating ranging in thickness from 150 to 300 $\mu$m.

After room temperature curing, the coating includes $ZrB_2$, SiC, $Zr(HPO_4)_2 \cdot H_2O$, and $SiHP_3O_{10}$ and is dense and well-adhered to the carbon. The zirconium and silicon hydrogen phosphates were formed as a result of reactions of $ZrB_2$ and SiC with phosphoric acid. The preferred composition of starting materials of the coating (in moles) is $2ZrB_2+SiC +0.8H_3PO_4$. Since seven moles of $H_3PO_4$ would be required for complete reaction of phosphoric acid with $ZrB_2$ and SiC, only relatively small amounts of $Zr(HPO_4)_2 \cdot H_2O$ and $SiHP_3O_{10}$ are formed. The zirconium and silicon hydrogen phosphates exhibit excellent wettability and bonding to carbon and are responsible for the good adhesion of the coating.

The chemical composition of the coating changes as a function of temperature during use in oxidizing environments. At temperatures up to 500° C., $Zr(HPO_4)_2 \cdot H_2O$, and $SiHP_3O_{10}$ lose water forming $SiP_2O_7$ and $ZrP_2O_7$. The presence of $SiP_2O_7$ in the coating is considered beneficial since it exhibits plasticity in the 600° C. to 800° C. range which allows the coating to accommodate thermal expansion mismatch with the carbon substrate thereby avoiding spalling and cracking. At 1000° C. to 1200° C., $SiP_2O_7$ decomposes forming $SiO_2$ and $P_2O_5$, while $ZrB_2$ starts to oxidize forming $ZrO_2$ and $B_2O_3$. At 1200° C., SiC starts to oxidize forming $SiO_2$ and $CO_2$. At 1200–1300° C., an oxidation protection layer of $ZrO_2$, $ZrSiO_4$, and borosilicate glass exists on the outer surface of the coating. At 1300–1500° C., $ZrP_2O_7$ decomposes forming $ZrO_2$ and $P_2O_5$. In addition, $SiO_2$ slowly evaporates from $ZrSiO_4$ forming $ZrO_2$. The final composition of the coating is $ZrO_2$ and borosilicate glass.

Oxidation experiments were performed on coated carbon samples (70% porous amorphous carbon foam, 70% porous graphite foam, 20% porous monolithic graphite, and 6% porous carbon-carbon composite). The oxidation conditions were by furnace heating in air at 1200–1400° C. for 0.5 to 2 hours and in the flame of an oxygen/acetylene torch at 1900° C. for up to 3 minutes. For all conditions investigated, the coating provided excellent oxidation protection for the carbon samples. Adhesion of the coating was maintained, and there was no indication of cracking or spalling by the coating in the thermal shock conditions investigated.

Alternative compositions of the coating can be the partial or complete substitution of hafnium diboride for zirconium diboride. Oxidation resistance of the hafnium-based coating is believed to be very similar to that of the zirconium-based coating. Additional modifications of the coating can be accomplished by partial substitution of the borides or suicides of Ti, Ta, Cr, Nb, V, Re, for zirconium.

The present invention provides a composition for oxidation protection of carbon based materials. The composition of the coating, containing zirconium diboride, silicon carbide, zirconium hydrogen phosphate, and silicon hydrogen phosphate is utilized in a coating formulation for carbon. The exceptional adhesion of the coating to carbon is provided by the silicon and zirconium hydrogen phosphates which form as a result of chemical reactions with phosphoric acid. In addition, this. exceptional adhesion contributed to the elimination of microcracking during coating application and use. The coating forms a dense, oxidation protective layer on carbon which remains intact to very high temperatures. The critical features of the invention are that the coating is applied and cured at room temperature and ambient atmosphere, and that it can be applied using conventional, low-cost painting techniques on large and intricately shaped structures. These features will lead to significant decrease in cost because of lower energy consumption and no need for complex processing equipment, compared to the methods of applying conventional coatings Additionally, the method allows the application of coatings in fleet conditions, both on new articles and for repair of previously coated parts.

Oxidation testing at 1300 to 1600° C. for 2 hours, and at 1900° C. for 5 minutes, has shown that the coating protects carbon from oxidation, (1900° C. is the highest temperature at which the coating could be tested). The coating formulation is capable of providing the oxidation protection at temperatures up to 1900° C. and be applied using low-cost painting techniques and room temperature cure.

Figure 2:
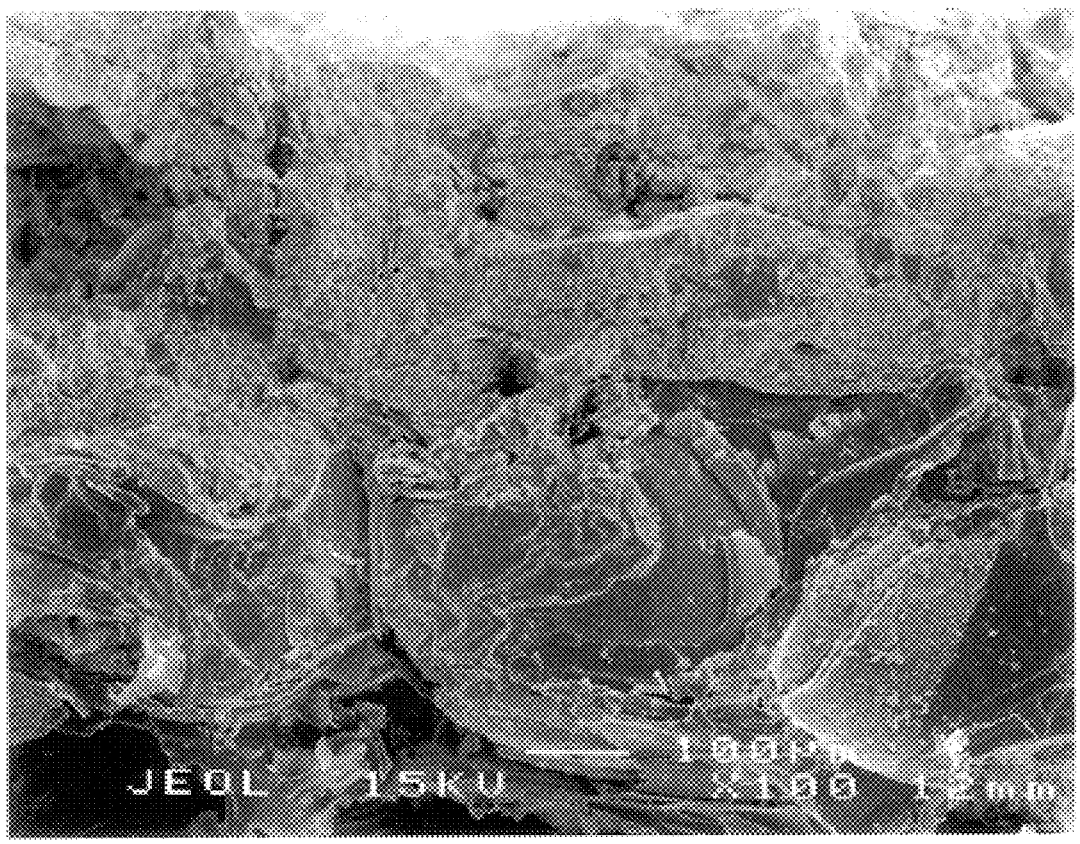
FIG. 2 shows a cross-sectional view of SEM of R.T. (room temperature) cured $ZrB_2/SiC/H_3PO_4$ coating on graphite foam that has excellent wetting and adhesion.
Figure 3:
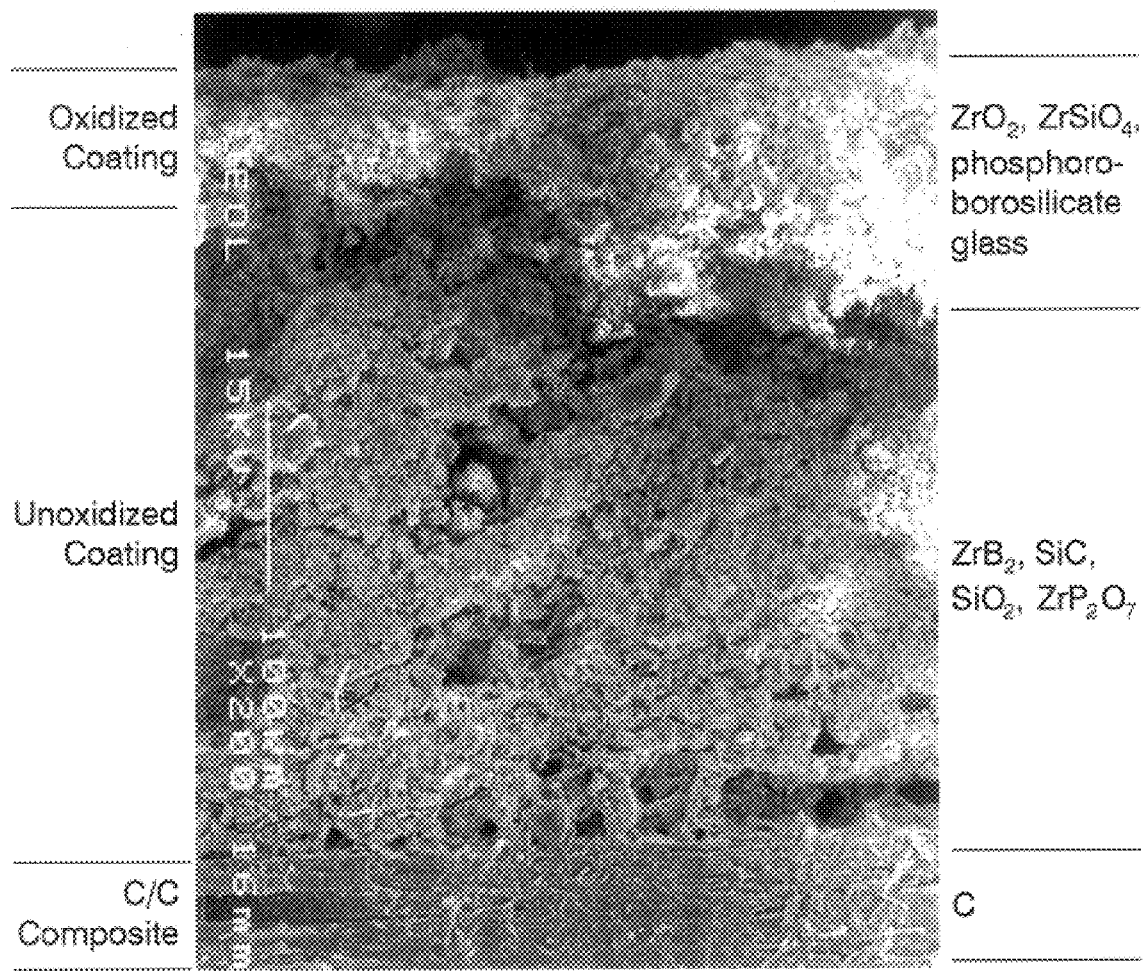
FIG. 3 shows coated carbon-carbon composite oxidized at 1400° C. for 30 minutes showing progression of oxidation front in the coating.
Figure 4:
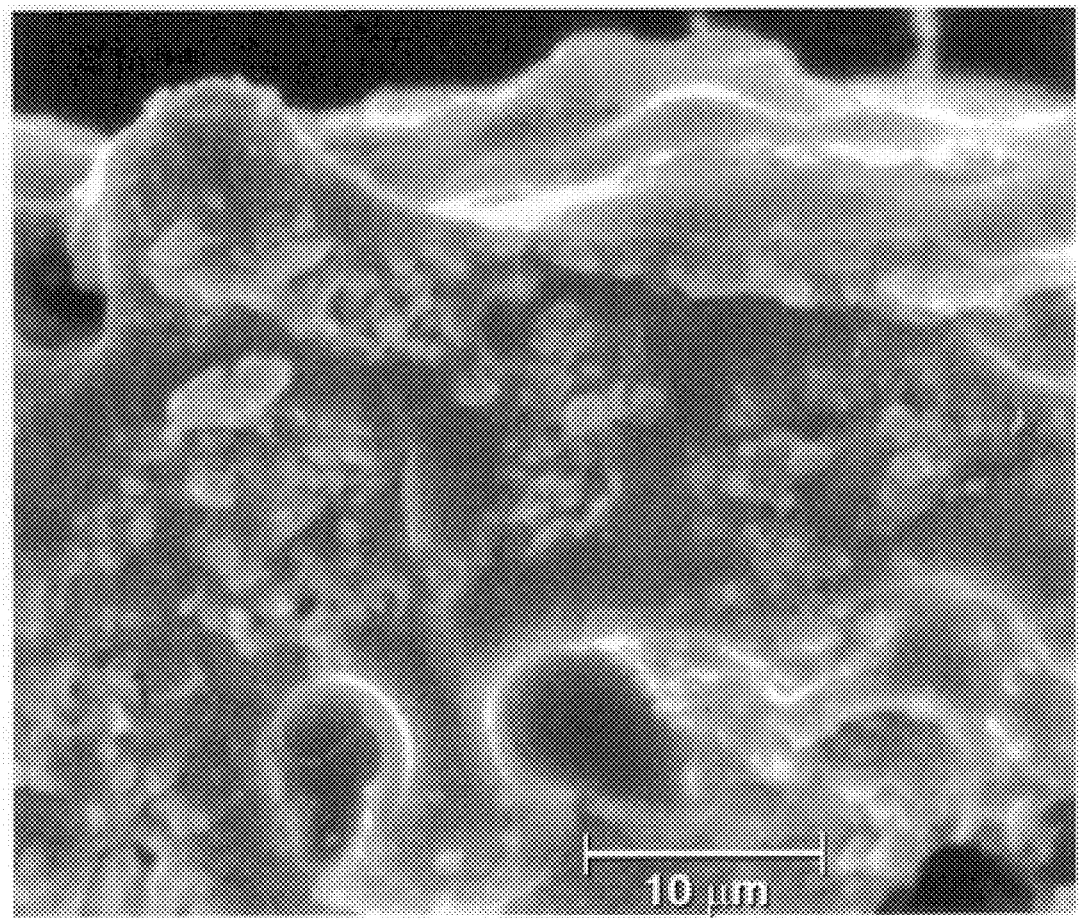
FIG. 4 shows SEM of cross-section of the coating oxidized at 1900° C. showing protective surface glass and evidence of immiscibility.

FIG. 1 shows a SEM of a surface of $ZrB_2+SiC+H_3PO_4$ coating cured at R.T. (room temperature) having dense, crack-free coating. FIG. 2 shows a cross-sectional view of SEM of R.T. (room temperature) cured $ZrB_2/SiC/H_3PO_4$ coating on graphite foam that has excellent wetting and adhesion. FIG. 3 shows coated carbon-carbon composite oxidized at 1400° C. for 30 minutes showing progression of oxidation front in the coating. FIG. 4 shows SEM of crosssection of the coating oxidized at 1900° C. showing protective surface glass and evidence of immiscibility.

While the invention has been particularly shown and described with reference to the preferred embodiments thereof, it will be understood by those skilled in the art that the foregoing land other changes in form and details may be made therein without departing from the spirit and scope of the invention.

What is claimed is:

1. A ceramic coating composition, consisting essentially of:
   at least one member selected from a group consisting of zirconium diboride and hafnium diboride;
   silicon carbide;
   zirconium phosphate; and
   silicon phosphate.

2. The ceramic coating composition of claim 1, having a molar ratio of zirconium diboride to silicon carbide between and including 5:1 to and including 1:1.

3. The ceramic coating composition of claim 1, having a molar ratio of zirconium diboride to silicon carbide of 2:1.

4. The ceramic coating composition of claim 1, wherein phosphoric acid solution, zirconium diboride and silicon carbide are starting materials.

5. The ceramic coating composition of claim 4, with the concentration of phosphoric acid being between and including about 85 percent to and including about 40 percent in said phosphoric acid solution.

6. The ceramic coating composition of claim 5, with the concentration of phosphoric acid being about 85 percent.

7. The ceramic coating composition of claim 4, with zirconium diboride being a powder with a particle size below 44 microns.

8. The ceramic coating composition of claim 4, with silicon carbide including at least three different sizes of powder forms, a first silicon carbide powder having an average particle size of about 1 micrometer, a second silicon carbide powder having an average particle size of about 5 micrometers to about 10 micrometers, and a third silicon carbide powder having an average particle size of about 10 to about 20 micrometers.

9. The ceramic coating composition of claim 4, with silicon carbide having an average particle size of about 20 micrometers.

10. The ceramic coating composition of claim 1, wherein said ceramic coating composition is applied as a coating having a thickness of less than or equal to 100 micrometers.

11. The ceramic coating composition of claim 4, wherein said starting materials of said ceramic coating composition being in moles $2ZrB_2+SiC+0.8H_3PO_4$.

12. A ceramic coating composition for carbon, comprising:
    at least one member selected from a group consisting of zirconium diboride and hafnium diboride;
    silicon carbide;
    zirconium phosphate; and
    silicon phosphate.

13. The ceramic coating composition of claim 12, having a molar ratio of zirconium diboride to silicon carbide between and including 5:1 to and including 1:1.

14. The ceramic coating composition of claim 12, having a molar ratio of zirconium diboride to silicon carbide of 2:1.

15. The ceramic coating composition of claim 12, wherein phosphoric acid solution, zirconium diboride and silicon carbide are starting materials.

16. The ceramic coating composition of claim 15, with the concentration of the phosphoric acid being between and including about 85 percent to and including about 40 percent in said phosphoric acid solution.

17. The ceramic coating composition of claim 16, with the concentration of phosphoric acid being about 85 percent.

18. The ceramic coating composition of claim 15, with the zirconium diboride being a powder with a particle size below 44 microns.

19. The ceramic coating composition of claim 15, with silicon carbide including at least three different sizes of powder forms, a first silicon carbide powder having an average particle size of about 1 micrometer, a second silicon carbide powder having an average particle size of about 5 micrometers to about 10 micrometers, and a third silicon carbide powder having an average particle size of about 10 to about 20 micrometers.

20. The ceramic coating composition of claim 15, with the silicon carbide having an average particle size of about 1 micrometer.

21. The ceramic coating composition of claim 12, wherein said ceramic coating composition is applied as a coating having a thickness of less than or equal to 100 micrometers.

22. The ceramic coating composition of claim 12, wherein said ceramic coating composition is applied as a coating having a thickness of from 150 micrometers to 300 micrometers.

23. The ceramic coating composition of claim 15, wherein said starting materials of said ceramic coating composition being in moles $2ZrB_2+SiC+0.8H_3PO_4$.

24. The ceramic coating composition of claim 15, wherein said starting materials are cured at a temperature from 25 degrees to 100 degrees Celsius on said carbon.

25. The ceramic coating composition of claim 12, further comprising borides or silicides of a group consisting of Ti, Ta, Cr, Nb, and V.

26. A method for coating a carbon surface, comprising the steps of:
    mixing together a phosphoric acid, silicon carbide, and at least one member selected from the group consisting of zirconium diboride and hafnium diboride to form a starting mixture;
    coating a portion of the mixture on a first surface; and
    curing the portion of the mixture on the first surface to form the ceramic coating composition of claim 1.

27. The method of claim 26, with the first surface comprising carbon.

28. The method of claim 26, further comprising of the step of curing the mixture on the first surface at a temperature range of 25 degrees to 100 degrees Celsius.

29. The method of claim 26, further comprising of the step of curing the mixture on the first surface at a temperature of about 25 degrees Celsius.

30. The method of claim 29, further comprising of the step of curing the mixture on the first surface at a temperature of about 25 degrees Celsius for at least 18 hours.

31. The method of claim 26, further comprising the step of applying a second portion of the mixture on the first surface after curing.

32. The method of claim 27, with the molar ratios of zirconium diboride to silicon carbide being from 5:1 to 1:1.

33. The method of claim 27, with the molar ratios of zirconium diboride to silicon carbide being about 2:1.

34. The method of claim 26, with the concentration of the phosphoric acid being from 85 percent to 40 percent.

35. The method of claim 26, with the concentration of the phosphoric acid being at least 85 percent.

36. The method of claim 26, with the zirconium diboride being a powder with a particle size below 44 microns.

37. The method of claim 26, with the silicon carbide including at least three different sizes of powder forms, a first silicon carbide powder having an average particle size of about 1 micrometer, a second silicon carbide powder having an average particle size from 5 micrometers to 10 micrometers, and a third silicon carbide powder having an average particle size from 10 to 20 micrometers.

38. The method of claim 26, with the silicon carbide having an average particle size of about 1 micrometer.

39. The method of claim 26, with the coating having a thickness being less than or equal to 100 micrometers.

40. The method of claim 26, with the starting materials of the coating being in moles $2ZrB_2+SiC+0.8H_3PO_4$.

41. The method of claim 26, with the coating having a thickness being from 150 micrometers to 300 micrometers.

42. The method of claim 26, further comprising the step of mixing at least one boride or silicide of a group consisting of Ti, Ta, Cr, Nb, and V, with the mixture during the step of mixing together a phosphoric acid, silicon carbide, and at least one member selected from the group consisting of zirconium diboride and hafnium diboride.

* * * * *